United States Patent
Just et al.

(10) Patent No.: US 6,802,554 B1
(45) Date of Patent: Oct. 12, 2004

(54) CROSS FOLDING CONVERTIBLE TOP WITH ONE PIECE ONE BOW

(75) Inventors: Jan Just, Commerce Township, MI (US); Berthold Klein, Rutesheim (DE)

(73) Assignee: CTS Fahrzeug-Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 10/687,009

(22) Filed: Oct. 15, 2003

(51) Int. Cl.⁷ .................................................. B60J 7/12
(52) U.S. Cl. ................... 296/107.09; 296/116; 296/118
(58) Field of Search ....................... 296/107.01, 107.09, 296/107.12, 109, 116, 118, 225

(56) References Cited

U.S. PATENT DOCUMENTS

| | | | |
|---|---|---|---|
| 2,172,303 A | | 9/1939 | Uebergang |
| 2,794,672 A | | 6/1957 | Burzi |
| 3,276,814 A | * | 10/1966 | Podolan ................... 135/88.09 |
| 3,473,842 A | * | 10/1969 | Glossop, Jr. et. al. ...... 296/116 |
| 4,573,732 A | | 3/1986 | Muscat |
| 4,712,828 A | | 12/1987 | Albrecht |
| 4,720,133 A | * | 1/1988 | Alexander et al. .......... 296/117 |
| 4,929,015 A | | 5/1990 | Bauer |
| 5,004,291 A | | 4/1991 | Bauer et al. |
| 5,335,959 A | | 8/1994 | Schrader et al. |
| 5,667,269 A | | 9/1997 | Prenger et al. |
| 5,829,821 A | | 11/1998 | Aydt et al. |
| 5,903,119 A | | 5/1999 | Laurain et al. |
| 6,039,382 A | | 3/2000 | Mather et al. |
| 6,048,021 A | | 4/2000 | Sautter, Jr. |
| 6,237,986 B1 | | 5/2001 | Neubrand et al. |
| 6,412,860 B1 | * | 7/2002 | Reinsch ..................... 296/219 |
| 6,416,111 B1 | * | 7/2002 | Neubrand ............. 296/107.09 |
| 6,550,842 B1 | * | 4/2003 | Halbweiss et al. .......... 296/116 |
| 6,623,065 B2 | * | 9/2003 | Halbweiss et al. .......... 296/122 |
| 2003/0038501 A1 | * | 2/2003 | Heselhaus ............. 296/107.09 |

FOREIGN PATENT DOCUMENTS

| | | | | |
|---|---|---|---|---|
| DE | 3339057 A1 | * | 5/1985 | ................. 296/116 |
| DE | 3837522 A1 | | 5/1990 | |
| DE | 298 23 383 U1 | | 6/1999 | |
| DE | 199 11 541 A1 | | 5/2000 | |

* cited by examiner

*Primary Examiner*—D. Glenn Dayoan
*Assistant Examiner*—Paul Chenevert
(74) *Attorney, Agent, or Firm*—Brooks Kushman P.C.

(57) ABSTRACT

A convertible top having right and left side rails that fold toward each other as the convertible top is retracted. A segmented one bow is connected by a linkage to the side rails. The side rails being shiftable from an extended position wherein they extend longitudinally relative to the vehicle to a retracted position wherein the side rails extend transversely relative to the vehicle. A one piece one bow is latched to the windshield header in the extended position and is stored in a storage compartment when the convertible top is retracted.

13 Claims, 4 Drawing Sheets

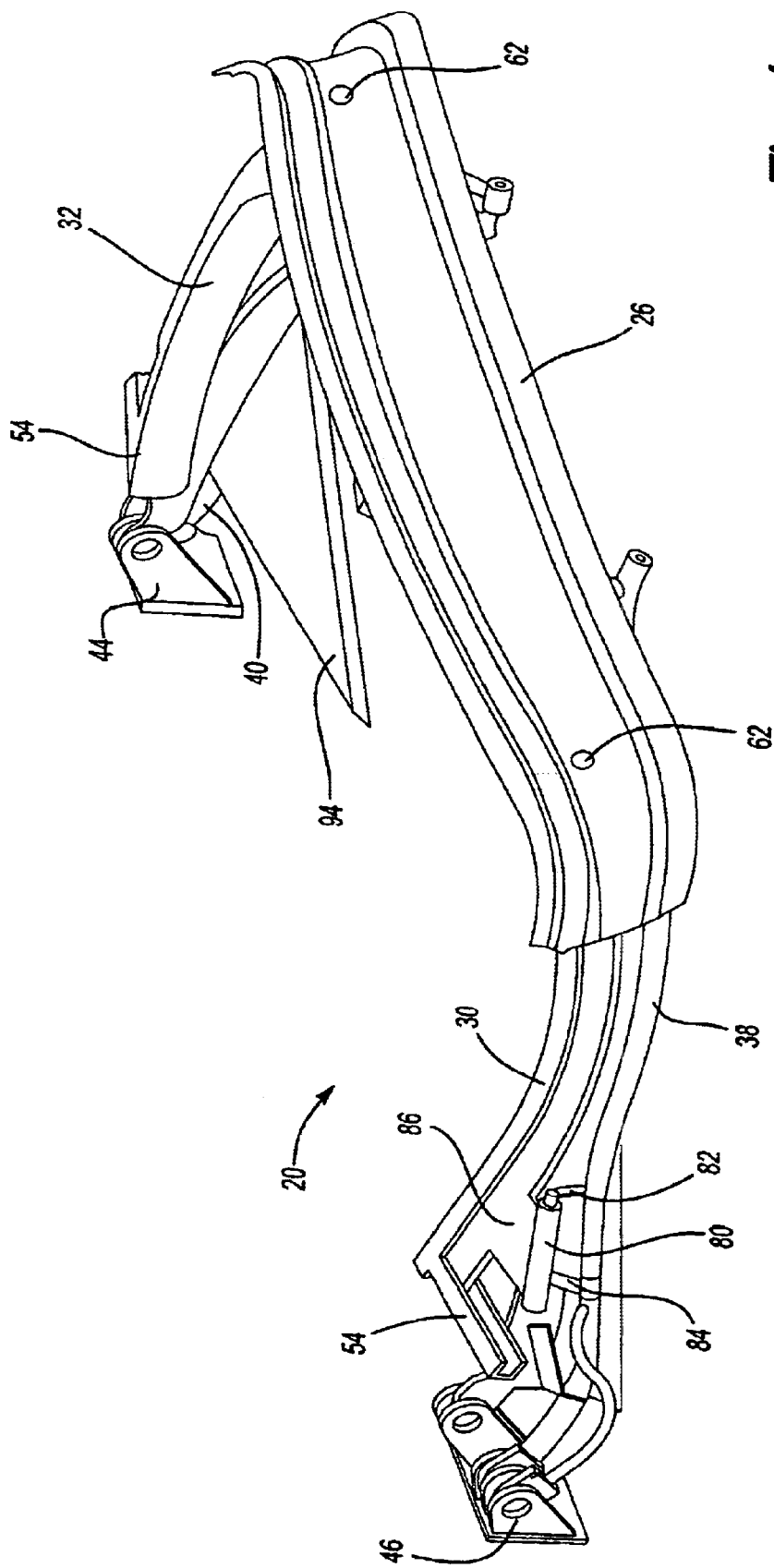

CROSS FOLDING CONVERTIBLE TOP WITH ONE PIECE ONE BOW

BACKGROUND OF THE INVENTION

1. Field of the Invention

The present invention relates to a soft convertible top for a vehicle.

2. Background Art

Convertible top normally have a top stack linkage made up of segmented side rails that are interconnected by a plurality of bows. As the top stack linkage retracts, the segmented side rails are sequentially moved into a rear storage area. The segments of the side rails carry their associated bows rearwardly in a generally linear retraction path. The "one bow" is normally connected to the forward end of the side rails. The side rails are normally articulated segmented members that pivot relative to each other and a main body pivot as the top is extended and retracted. When the top stack is retracted, the one bow is lifted by the side rails from the windshield header and moved rearwardly into a storage compartment located behind the rearmost seats of the vehicle.

A convertible top must establish an effective seal with the upper edges of the vehicle windows and the windshield. Prior art segmented side rails have generally required segmented seals to establish a seal between the side rails and the upper edges of the vehicle windows. Separations between adjacent seal segments necessitated by the segmented construction of the side rails create potential leak paths for water. Applicant's assignee's prior U.S. Pat. No. 6,416,111 discloses a cross-folding top having a segmented one bow having three segments that form a seal as they contact the windshield header. While effective sealing systems have been developed to minimize water leakage problems, this is a continuing concern in the design and construction of convertible tops.

Segmented side rails also include many parts that must be formed to critical tolerances and subjected to rigorous quality control to assure reliable operation of the convertible top. The number of critical parts in conventional convertible tops and in particular the number of parts making up the side rails and linkages between side rail segments increase the cost of a convertible top.

Prior to applicants' invention there was a need for a convertible top having a one piece side rail and a one piece one bow that may each be sealed by a respective one piece seal. It would also be desirable to provide a convertible top that minimizes the number of components required to form the convertible top and that also minimize the number of parts required to form the side rails and one bow of the convertible top.

These and other problems and objectives are addressed by the applicant's invention as summarized below.

SUMMARY OF THE INVENTION

According to the present invention, a convertible top is provided for a vehicle having a passenger compartment and a storage area for the convertible top. The convertible top includes a top stack linkage that is movable between an extended position and a retracted position. The top stack linkage has a plurality of bows that extend transversely between a right side rail and a left side rail. The side rails extend longitudinally relative to the vehicle when the top stack linkage is in the extended position. A one bow is formed in one piece and is received by the windshield header when the top stack linkage is in its extended position. The side rails each have a forward end and a rearward end and are connected to the one bow by a linkage. The forward ends of the side rails move inwardly about a pivot point located near the rear portions of the side rails causing the side rails to extend transversely relative to the vehicle when the top stack linkage is retracted.

According to other aspects of the invention, a linkage rotates the side rails so that the forward ends of the side rails pivot outwardly to extend longitudinally as the top stack linkage is extended. The linkage rotates the forward ends of the side rails inwardly to extend across the vehicle as the top stack linkage is retracted. The linkage connecting the side rails near their forward ends to the one bow may comprise a first pair of links each fixedly secured to one of the side rails and a second pair of links each pivotally connected to one of the first links and the one bow. A flexible cover is secured to the top stack linkage to enclose the passenger compartment when the top stack linkage is extended. The flexible cover is stored with the top stack linkage in the storage area when the convertible top is retracted.

According to another aspect of the present invention, the second bow comprises a central section and right and left side links. The central section is pivotally connected with a compound pivot joint to the side links that are pivotally connected on their other ends to the side rails. The side links are rotated outboard of the side rails when the top is retracted and the right and left side links are rotated to support the central section within the side rails when the top is extended.

The present invention may also be characterized as a convertible top for a vehicle having right and left side rails each having a back end that is pivotally connected by a linkage to the right and left main pivot brackets that are secured to right and left sides of the vehicle. The right and left side rails are moved between a first position wherein the side rails extend longitudinally and a second position wherein the side rails extend transversely relative to the vehicle. A one piece one bow extends between distal ends of the right and left side rails and is connected to the side rails by a linkage that allows the distal ends of the side rails to converge as the top is shifted from an extended position to a retracted position. The linkages between the side rails and the first bow allow the distal ends of the side rails to diverge as the top is shifted from the retracted position to the extended position.

According to another aspect of the invention, at least one intermediate bow extends between the right and left side rails and is connected to the right and left side rails by right and left pivoting links.

According to yet another aspect of the invention, the convertible top includes a flexible cover that is secured to right and left side rails.

These and other aspects and advantages of the present invention will be better understood in view of the attached drawings and following detailed description.

BRIEF DESCRIPTION OF THE DRAWINGS

FIG. 4 is a rear/side perspective view of the cross folding convertible top of the present invention in its retracted position.

DETAILED DESCRIPTION OF THE PREFERRED EMBODIMENT(S)

Figure 1:
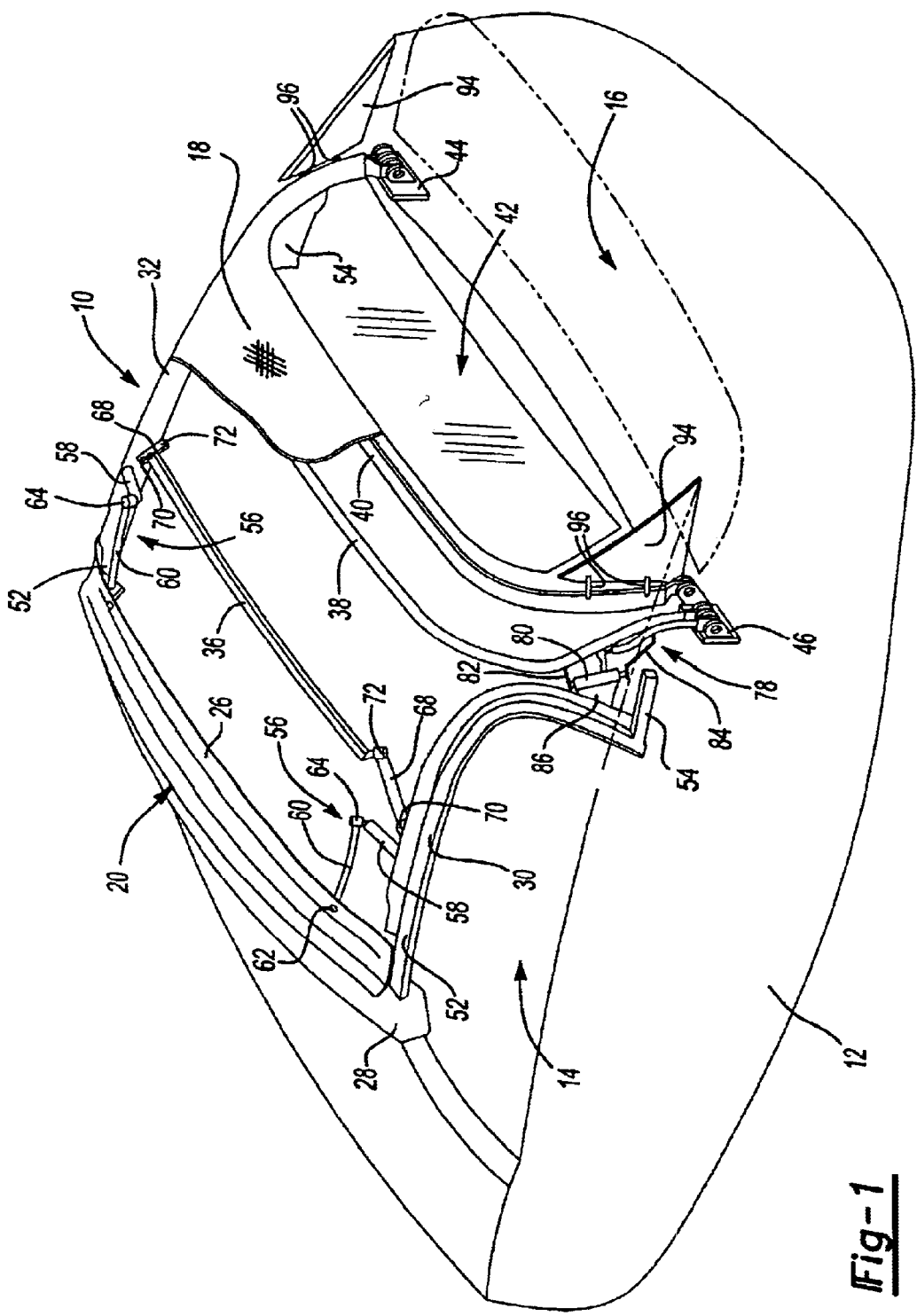
FIG. 1 is a rear/side perspective view of the cross folding convertible top of the present invention in its extended position that is attached to a vehicle, shown in phantom.
Figure 2:
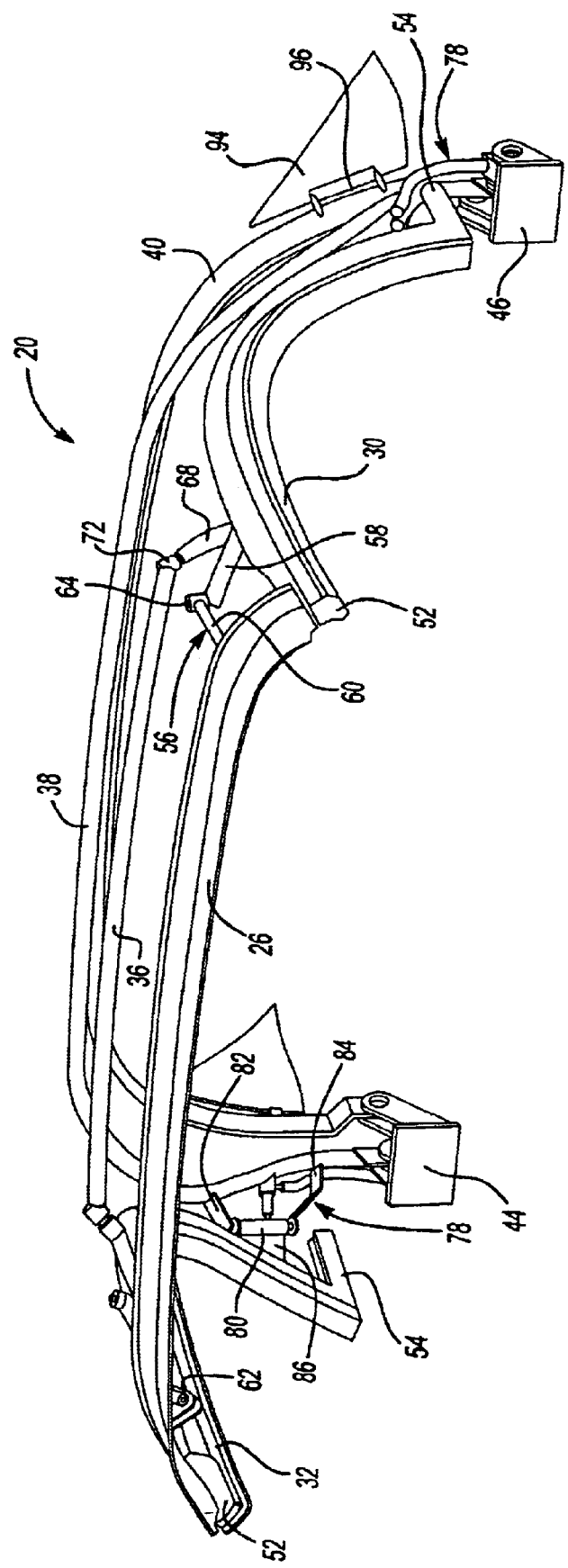
FIG. 2 is a front/side perspective view of the cross folding convertible top of the present invention in its extended position.

Referring now to FIGS. 1 and 2, a convertible top 10 for a vehicle 12 is illustrated. The convertible top 10 encloses a passenger compartment 14 of the vehicle 12, when the convertible top 10 is in its extended position. A storage compartment 16 is provided in the vehicle 12 for storage of the convertible top 10, when it is in its retracted position. A flexible cover 18 is attached to a top stack 20 and together form the convertible top 10.

The top stack 20 comprises a one bow 26 that is adapted to be secured to a windshield header 28. The sides of the top stack 20 are defined by left and right side rails 30 and 32. The top stack 20 further comprises a two bow 36, three bow 38 and four bow 40, that define spaced ribs that support the cover 18 when the convertible top 10 is in its extended position. A rear window 42 is supported on the four bow 40. The rear window 42 completes the enclosure of the passenger compartment in conjunction with the cover 18. The rear window 42 is a fixed window in the illustrated embodiment, but could also be a retractable or sliding window. The top stack 20 is connected by a right main pivot bracket 44 and a left main pivot bracket 46 to the vehicle 12. The three bow 38 and four bow 40 are directly connected in a pivoting connection to the right and left main pivot brackets 44 and 46. The left and right side rails 30 and 32 are connected to the right and left main pivot brackets 44 and 46, respectively, indirectly through the three bow 38.

The front end 52 of the side rails 30 and 32 are contiguous with the one bow 26 when the convertible top 10 is in its extended position. The back end 54 of the side rails are located near the right and left main pivot brackets 44 and 46. The side rails 30 and 32 are linked to the top stack 20 so that they pivot inwardly as they move from the extended position to the retracted position. When the top stack 20 is extended, the side rails 30 and 32 pivot generally about the back ends 54 of the side rails 30 and 32, respectively.

A one bow to side rail linkage 56 connects the one bow 26 to the right and left side rails 30 and 32. Each one bow to side rail linkage 56 includes a fixed link 58 that is fixedly connected to one of the side rails 30, 32. The one bow to side rail linkage 56 each also include a pivoting link 60 that connects the one bow 26 to the fixed link 58. The pivoting link 60 has a one bow pivot connection 62 and a link pivot connection 64. The one bow pivot connection 62 and link pivot connection 64 may be ball joints or single axis pivots that allow the front ends 52 of the side rail to move inwardly relative to the one bow 26, or in the pivoting links 60 in the extended position is oriented substantially perpendicularly to the fixed link 58 in the extended position. In the retracted position the pivoting link 60 is oriented in a substantially parallel relationship relative to the fixed link 58.

A dual pivot link 68 is provided on each end of the two bow 36. The dual pivot link 68 includes a side rail pivot connection 70 and a two bow pivot connection 72 that connects the two bow 36 to left side rail 30 and right side rail 32. In the extended position, the dual pivot links 68 and two bow 36 are generally in alignment extending between the left side rail 30 and right side rail 32. When the top stack 20 is in its retracted position, the dual pivot links 68 are generally oriented parallel to the two bow and are oriented generally parallel to the left side rail 30 and right side rail 32 that, in this position, extend transversely across the vehicle 12.

A side rail pivot linkage 78 is provided between the side rails 30 and 32 and the three bow 38. The side rail pivot linkage 78 includes a pivot rod connection 80 that is supported relative to the three bow 38 by an upper arm 82 and a lower arm 84. The pivot rod connection 80 is also supported relative to each of the side rails 30 and 32 by a plate 86.

Side trim panels 94 are connected by hinges 96 to the four bow 40.

Figure 3:
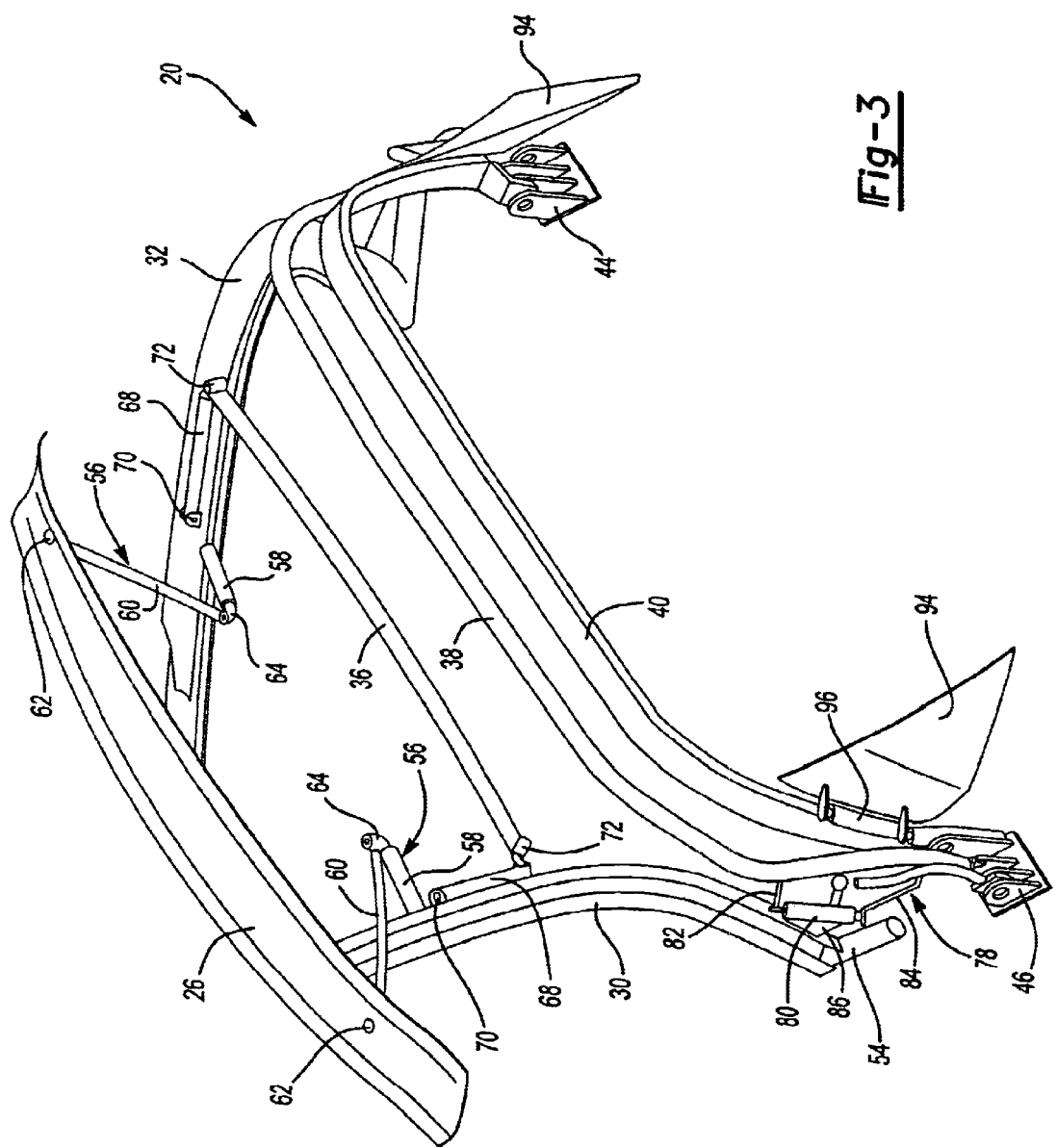
FIG. 3 is a rear/side perspective view of the cross folding convertible top of the present invention shown in a midcycle position.

Retraction of the convertible top 10 will be described with reference to FIGS. 3 and 4. Retraction begins with the convertible top 10 in the position shown in FIGS. 1 and 2. The first step in the retraction process is to disengage one bow 26 from the windshield header 28. The one bow 26 and windshield header 28 are normally secured together by means of mechanical clamps (not shown) that are well known in the art. The convertible top 10 is a manual convertible top that is raised and lower manually by pushing the one bow 26 rearwardly. Referring to FIG. 3, the one bow 26 has been displaced rearwardly and the pivoting links 60 have rotated to a position wherein the one bow pivot connections 62 are outboard of the side rails 30 and 32. The dual pivot links 68 have been rotated to a position generally parallel to the right and left side rails 30 and 32 that have moved to a position wherein their front ends 52 are converging together. The three bow 38 is retracted towards the four bow 40 and the side trim panels 94 have pivoted toward each other on the four bow 40.

Referring now to FIG. 4 the top stack 20 is shown in is fully retracted condition wherein the one bow 26, two bow 36, three bow 38 and four bow 40 are all disposed within the storage compartment 16. The side trim panels 94 are also folded into the storage compartment 16 and are generally horizontally oriented and extending toward each other from opposite sides of the vehicle 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle having a passenger compartment and a storage area comprising:
   a top stack linkage moveable between an extended position and a retracted position, the top stack linkage having a right side rail and a left side rail, the side rails extending longitudinally relative to the vehicle when the top stack linkage is in the extended position, the side rails each having a forward end and a rearward end, a one bow being formed in one piece and being received by the windshield header when the top stack linkage is in the extended position, the forward ends of the side rails being contiguous with the one bow in the extended position and the side rails being pivoted about a pivot axis near the rearward end of the side rails to extend transversely relative to the vehicle in the retracted position; and
   a flexible cover secured to the top stack linkage encloses the passenger compartment when the top stack linkage is extended and is stored in the storage area when the top stack linkage is retracted.

2. The convertible top of claim 1 further comprising a pair of linkages connecting the one bow to each of the right and left side rails, each linkage further comprising a fixed link attached to one of the side rails and a pivoting link that is pivotally connected to the one bow on one end and the fixed link on the other end.

3. The convertible top of claim 1 wherein a two bow comprises a central section and right and left side portions and wherein the central section is pivotally connected on opposite lateral ends to one of each of the right and left side portions, the right and left side portions being pivotally connected to the right and left side rails, respectively, the right and left side portions being partially rotated from a position outboard of the side rails in the retracted position to a position inboard of the side rails and generally aligned with the central portion in the extended position.

4. The convertible top of claim 1 wherein the forward ends of the side rails separate from the lateral ends of the one bow as the top stack linkage is moved from the extended position to the retracted position.

5. The convertible top of claim 1 further comprising a right main pivot and a left main pivot connected by a pair of linkages to the rearward ends of each of the right and left side rails, the main pivots rotating the side rails between an upstanding orientation when the top stack linkage is extended and a horizontal orientation when the top stack linkage is retracted.

6. The convertible top of claim 4 further comprising a three bow with a right end and a left end, the three bow right end and the three bow left end connected to each of the right main body pivot and the left main body pivot respectively, the three bow pivoting rearwardly as the top is retracted and being connected by a pair of linkages to the side rails, wherein the side rails pivot inwardly as the top is retracted.

7. The convertible top of claim 6 further comprising a four bow having a right end and a left end, the four bow being placed rearward of the three bow, and having the four bow right end and the four bow left end connected to each of the right main body pivot and the left main body pivot, the four bow pivoting rearwardly as the top is retracted, and being connected by a pair of linkages to the side rails, wherein the side rails pivot inwardly as the top is retracted.

8. A convertible top for a vehicle, comprising:

right and left side rails each having a back end that is pivotally connected by a linkage to one of a right main pivot bracket and a left main pivot bracket on right and left sides of the vehicle, the right and left side rails each having distal ends on the opposite ends thereof from the back ends, the distal ends being moved between a first position wherein the side rails extend longitudinally relative to the vehicle and a second position wherein the side rails extend transversely relative to the vehicle; and a first bow formed in a single piece that extends the length of the windshield header and is connected to the side rails near their distal ends by a linkage.

9. The convertible top of claim 8 further comprising a second bow spaced rearward of the first bow and extending between the right and left side rails, the second bow being articulated to allow the distal ends of the side rails to converge as the top is shifted from the first position to the second position, wherein the distal ends of the side rails diverge as the top is shifted from the second position to the first position.

10. The convertible top of claim 9 wherein the second bow further comprises at least one intermediate section extending between the right and left side rails and being connected to the right and left side rails by right and left links, respectively.

11. The convertible top of claim 8 further comprising a third bow having a right end and a left end, the right end of the third bow and the left end of the third bow being connected to the right main pivot and the left main pivot, respectively.

12. The convertible top of claim 11 wherein the third bow right end and the third bow left end are further connected by a pair of linkages to the right side rail and the left side rail, respectively, wherein the right and left side rails pivot inwardly when the top is moved from the first position to the second position.

13. The convertible top of claim 12 further comprising a fourth bow disposed rearward of the third bow and being connected to the right main pivot bracket and the left main pivot bracket, the fourth bow pivoting rearwardly as the top is retracted.

* * * * *